United States Patent
Kim et al.

(10) Patent No.: US 9,798,060 B2
(45) Date of Patent: Oct. 24, 2017

(54) ADHESIVE FILM FOR POLARIZING PLATE, POLARIZING PLATE INCLUDING THE SAME AND OPTICAL DISPLAY INCLUDING THE SAME

(71) Applicant: SAMSUNG SDI CO., LTD., Yongin-si, Gyeonggi-do (KR)

(72) Inventors: Won Kim, Uiwang-si (KR); Yi Eun Kim, Uiwang-si (KR); Yoo Jin Suh, Uiwang-si (KR); Seung Jun Lee, Uiwang-si (KR); Ha Yun Cho, Uiwang-si (KR); In Cheon Han, Uiwang-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 172 days.

(21) Appl. No.: 14/461,863

(22) Filed: Aug. 18, 2014

(65) Prior Publication Data
US 2015/0055219 A1 Feb. 26, 2015

(30) Foreign Application Priority Data
Aug. 22, 2013 (KR) .................. 10-2013-0099973

(51) Int. Cl.
*G02B 5/30* (2006.01)
*C08F 220/18* (2006.01)
(Continued)

(52) U.S. Cl.
CPC .......... *G02B 5/3083* (2013.01); *C08F 220/18* (2013.01); *C08F 220/28* (2013.01); (Continued)

(58) Field of Classification Search
CPC .. G02B 5/3025; G02B 5/3033; G02B 5/3083; G02F 1/133528
(Continued)

(56) References Cited

U.S. PATENT DOCUMENTS

2007/0166537 A1* 7/2007 Nagamoto ............. B32B 37/12
 428/355 AC
2008/0100780 A1* 5/2008 Suzuki ................. G02B 5/3033
 349/96

(Continued)

FOREIGN PATENT DOCUMENTS

CN 101910347 A 12/2010
CN 102585713 A 7/2012
(Continued)

OTHER PUBLICATIONS

Chinese Office Action dated Dec. 31, 2015 in Corresponding Chinese Patent Application No. 201410418290.1.

Primary Examiner — Ricky D Shafer
(74) Attorney, Agent, or Firm — Lee & Morse, P.C.

(57) ABSTRACT

An adhesive film for a polarizing plate includes a functional group represented by Formula 1:

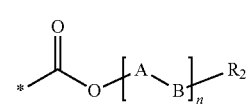

[Formula 1]

wherein * represents a binding site; A is a $C_1$ to $C_{20}$ aliphatic hydrocarbon group; B is —O—, —S—, a $C_1$ to $C_{20}$ aliphatic hydrocarbon group, or a single bond; $R_2$ is a $C_1$ to $C_{20}$ aliphatic hydrocarbon group; and n is an integer from 1 to 5.

14 Claims, 1 Drawing Sheet

(51) Int. Cl.
*C09J 4/00* (2006.01)
*C08F 220/28* (2006.01)
*C09J 133/06* (2006.01)

(52) U.S. Cl.
CPC ............. *C09J 4/00* (2013.01); *C09J 133/066* (2013.01); *G02B 5/3025* (2013.01); *G02B 5/3033* (2013.01)

(58) Field of Classification Search
USPC .................................. 359/487.02, 489.07
See application file for complete search history.

(56) References Cited

U.S. PATENT DOCUMENTS

| | | | | |
|---|---|---|---|---|
| 2009/0167994 | A1* | 7/2009 | Suzuki | G02B 5/3033 349/96 |
| 2012/0257145 | A1* | 10/2012 | Lee | G02B 5/3016 349/75 |
| 2012/0305181 | A1* | 12/2012 | Nam | B32B 7/06 156/305 |
| 2014/0000482 | A1* | 1/2014 | Lee | G02B 1/105 106/287.21 |
| 2014/0378614 | A1* | 12/2014 | Kim | G02B 5/3033 525/123 |
| 2016/0115355 | A1* | 4/2016 | Kim | B32B 7/12 525/219 |

FOREIGN PATENT DOCUMENTS

| | | |
|---|---|---|
| CN | 102816547 A | 12/2012 |
| CN | 103003379 A | 3/2013 |
| JP | 2000-352619 | 12/2000 |
| JP | 2010-196001 A | 9/2010 |
| KR | 2013-0050879 A | 5/2013 |

* cited by examiner

ADHESIVE FILM FOR POLARIZING PLATE, POLARIZING PLATE INCLUDING THE SAME AND OPTICAL DISPLAY INCLUDING THE SAME

CROSS-REFERENCE TO RELATED APPLICATION

Korean Patent Application No. 10-2013-0099973, filed on Aug. 22, 2013, in the Korean Intellectual Property Office, and entitled: "Adhesive Film for Polarizing Plate, Polarizing Plate Including the Same and Optical Display Including the Same," is incorporated by reference herein in its entirety.

BACKGROUND

1. Field

Embodiments relate to an adhesive film for a polarizing plate, a polarizing plate including the same, and an optical display including the same.

2. Description of the Related Art

A polarizing plate includes a polarizer containing an iodine compound or dichroic material arranged in a certain direction. A polarizing plate may include protective films such as triacetyl cellulose (TAC) on both surfaces of the polarizer to protect the polarizer. The polarizing plate may have a structure in which the protective film is stacked on the polarizer with an adhesive layer interposed therebetween.

SUMMARY

Embodiments are directed to an adhesive film including a functional group represented by Formula 1:

[Formula 1]

wherein * represents a binding site; A is a $C_1$ to $C_{20}$ aliphatic hydrocarbon group; B is —O—, —S—, a $C_1$ to $C_{20}$ aliphatic hydrocarbon group, or a single bond; $R_2$ is a $C_1$ to $C_{20}$ aliphatic hydrocarbon group; and n is an integer from 1 to 5.

The functional group may be represented by Formula 1-1:

[Formula 1-1]

wherein * and n are defined as in Formula 1.

The functional group may be present in an amount of about 10 wt % to about 99 wt % in the adhesive film.

The adhesive film may have a photoelastic coefficient from about $-120\times10^{-12}$ $m^2/N$ to about $120\times10^{-12}$ $m^2/N$, as measured at about 23° C. and at a wavelength of about 590 nm.

The adhesive film may be formed of a composition including a (meth)acrylic copolymer formed using at least a monomer represented by Formula 2:

[Formula 2]

wherein A is a $C_1$ to $C_{10}$ aliphatic hydrocarbon group; B is —O—, —S—, a $C_1$ to $C_{10}$ aliphatic hydrocarbon group, or a single bond; $R_2$ is a $C_1$ to $C_{10}$ aliphatic hydrocarbon group; $R_1$ is hydrogen or a $C_1$ to $C_5$ alkyl group; and n is an integer from 1 to 5.

The monomer represented by Formula 2 may be present in an amount of about 50 wt % to about 100 wt % in the (meth)acrylic copolymer.

The (meth)acrylic copolymer may include a copolymer formed of a mixture of the monomer represented by Formula 2, an alkyl group-containing vinyl monomer, a carboxylic acid group-containing vinyl monomer, a hydroxyl group-containing vinyl monomer, and an amide group-containing vinyl monomer.

The mixture may include about 50 wt % to about 96 wt % of the monomer represented by Formula 2, about 0.1 wt % to about 30 wt % of the alkyl group-containing vinyl monomer, about 0.001 wt % to about 10 wt % of the carboxylic acid group-containing vinyl monomer, about 0.1 wt % to about 10 wt % of the hydroxyl group-containing vinyl monomer, and about 0.1 wt % to about 10 wt % of the amide group-containing vinyl monomer.

The mixture may further include an aromatic group-containing vinyl monomer.

The mixture may further include about 50 wt % to about 96 wt % of the monomer represented by Formula 2, about 0.1 wt % to about 20 wt % of the alkyl group-containing vinyl monomer, about 0.001 wt % to about 10 wt % of the carboxylic acid group-containing vinyl monomer, about 0.1 wt % to about 10 wt % of the hydroxyl group-containing vinyl monomer, about 0.1 wt % to about 10 wt % of the amide group-containing vinyl monomer, and about 0.1 wt % to about 14 wt % of the aromatic group-containing vinyl monomer.

The composition may further include at least one of a crosslinking agent and a silane coupling agent.

The crosslinking agent may include an isocyanate crosslinking agent.

The silane coupling agent may include an epoxy structure.

The composition may include about 70 wt % to about 99.5 wt % of the copolymer, about 0.1 wt % to about 20 wt % of the crosslinking agent, and about 0.1 wt % to about 10 wt % of the silane coupling agent in terms of solid content.

The adhesive film may have a thickness of greater than 0 μm and less than or equal to about 100 μm.

Embodiments are also directed to a polarizing plate including a polarizer, an optical film on a lower surface of the polarizer, and the adhesive film for a polarizing plate, as described above, on a lower surface of the optical film.

The polarizing plate may further include an optical film on an upper surface of the polarizer.

The polarizing plate may have a light leakage value (ΔL) from about 0 to about 0.4, as represented by Equation 1:

$$\Delta L=[(a+b+d+e)/4]/c-1 \quad \text{[Equation 1]}$$

wherein a, b, d and e represent a brightness at midpoints of respective sides of a panel upon which a polarizing plate is stacked, and c is brightness at a central site of the panel upon which the polarizing plate is stacked.

The optical film may be a triacetyl cellulose film. The adhesive film directly contacts the triacetyl cellulose film Embodiments are also directed to an optical display including the polarizing plate as described above.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Like reference numerals refer to like elements throughout.

In accordance with one aspect, an adhesive film for a polarizing plate (hereinafter referred to as "the adhesive film") may include a functional group represented by Formula 1:

[Formula 1]

wherein * represents a binding site; A is a $C_1$ to $C_{20}$ aliphatic hydrocarbon group; B is —O—, —S—, a $C_1$ to $C_{20}$ aliphatic hydrocarbon group, or a single bond; $R_2$ is a $C_1$ to $C_{20}$ aliphatic hydrocarbon group; and n is an integer from 1 to 5.

In one embodiment, A may be a $C_1$ to $C_{10}$ aliphatic hydrocarbon group, for example a linear or branched $C_1$ to $C_{10}$ alkylene group, or, for example, a linear or branched $C_1$ to $C_5$ alkylene group. B may be —O— or —S—, and $R_2$ may be a $C_1$ to $C_{10}$ aliphatic hydrocarbon group, for example, a linear or branched $C_1$ to $C_{10}$ alkyl group, or, for example, a linear or branched $C_1$ to $C_5$ alkyl group.

In one embodiment, the functional group represented by Formula 1 may be represented by Formula 1-1:

[Formula 1-1]

wherein * and n are defined as in Formula 1.

When the adhesive film includes the functional group represented by Formula 1, the adhesive film may suppress light leakage and may exhibit excellent durability and workability in high temperature and high humidity conditions. In one embodiment, the functional group represented by Formula 1 or Formula 1-1 may be present in an amount of about 10% by weight (wt %) to about 99 wt %, for example, about 50 wt % to about 95 wt %, or, for example, about 80 wt % to about 95 wt % in the adhesive film. Within this range, an adhesive layer having a low photoelastic coefficient may be effectively provided, thereby suppressing light leakage. In one embodiment, the adhesive film may have a photoelastic coefficient from about $-120\times10^{-12}$ $m^2/N$ to about $120\times10^{-12}$ $m^2/N$, or, for example, from about $-115\times10^{-12}$ $m^2/N$ to about $-1\times10^{-12}$ $m^2/N$, as measured at about 23° C. and at a wavelength of about 590 nm. Within this range, the adhesive film may suppress light leakage of a polarizing plate.

The adhesive film may have a thickness in a range greater than 0 μm and less than or equal to about 100 μm, for example, from about 1 μm to about 50 μm, or, for example, from about 5 μm to about 30 μm. Within this range, the adhesive film may be applied to polarizing plate.

The adhesive film may be used for bonding a plurality of optical films, such as a protective film or a retardation film, to each other or for bonding a polarizing plate to a panel.

The adhesive film may be bonded to an optical film having a low photoelastic coefficient among optical films attached to a polarizer. In one embodiment, the optical film may have a photoelastic coefficient from about $0.1\times10^{-12}m^2/N$ to about $100\times10^{-12}m^2/N$ at about 23° C. and at a wavelength of about 590 nm. As described above, even though the adhesive film according embodiments is bonded to the optical film having a low photoelastic coefficient, the adhesive film may prevent light leakage when used in liquid crystal displays.

The adhesive film may be formed of an adhesive composition including a (meth)acrylic copolymer having the functional group represented by Formula 1. For example, the adhesive film may be prepared by drying and/or aging the adhesive composition. Aging may include thermal curing, UV curing, or storage at about 35° C. for about 1 hour to about 1 week, as examples. For example, the adhesive film may be prepared by coating the adhesive composition onto a release film (for example, a polyethylene terephthalate film), followed by drying and curing at about 25° C. to about 50° C.

(Meth)Acrylic Copolymer

The (meth)acrylic copolymer includes the functional group represented by Formula 1 at a side chain thereof. Accordingly, the (meth)acrylic copolymer may suppress light leakage when included in the adhesive layer, and may provide a polarizing plate exhibiting excellent durability and workability at a high temperature and high humidity. In one embodiment, the (meth)acrylic copolymer may be a copolymer of a monomer mixture including a monomer represented by Formula 2:

[Formula 2]

wherein A is a $C_1$ to $C_{20}$ aliphatic hydrocarbon group; B is —O—, —S—, a $C_1$ to $C_{20}$ aliphatic hydrocarbon group, or a single bond; $R_2$ is a $C_1$ to $C_{20}$ aliphatic hydrocarbon group; $R_1$ is hydrogen or a methyl group; and n is an integer from 1 to 5.

When the (meth)acrylic copolymer includes the monomer represented by Formula 2, the adhesive film may suppress light leakage through improvement in optical properties and may secure adhesion.

The monomer represented by Formula 2 may be present in an amount of about 50 wt % to about 100 wt %, or, for example, about 50 wt % to about 96 wt %, or, for example, about 75 wt % to about 95 wt % in the monomer mixture or the (meth)acrylic copolymer. Within this range, an adhesive layer having a low photoelastic coefficient may be effectively realized. The monomer represented by Formula 2 may be synthesized by a typical method, or may be commercially available.

In one embodiment, the monomer mixture may include about 75 wt % to about 95 wt % of a monomer represented by Formula 2-1:

[Formula 2-1]

The (meth)acrylic copolymer may be a copolymer of a monomer mixture including at least one of the monomer represented by Formula 2, an alkyl group-containing vinyl monomer, a carboxylic acid group-containing vinyl monomer, a hydroxyl group-containing vinyl monomer, a hetero ring-containing vinyl monomer, an aromatic group-containing vinyl monomer, an alicyclic group-containing vinyl monomer, and an amide group-containing vinyl monomer.

The alkyl group-containing vinyl monomer may form a structure of the adhesive film for a polarizing plate. The alkyl group-containing vinyl monomer may include a (meth) acrylic acid ester having a linear or branched $C_1$ to $C_{20}$ alkyl group. For example, the alkyl group-containing vinyl monomer may include at least one of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, 2-ethylhexyl (meth) acrylate, heptyl (meth)acrylate, octyl (meth)acrylate, iso-octyl (meth)acrylate, nonyl (meth)acrylate, decyl (meth) acrylate, and dodecyl (meth)acrylate. These may be used alone or in combination thereof.

The alkyl group-containing (meth)acrylic monomer may be present in an amount of about 0.1 wt % to about 30 wt %, or, for example, about 0.1 wt % to about 20 wt %, or, for example, about 1 wt % to about 15 wt % in the (meth)acrylic copolymer. Within this range, the adhesive film may exhibit adhesion desirable for durability.

The carboxylic acid group-containing vinyl monomer may be a (meth)acrylic monomer and may include (meth) acrylic acid or β-carboxyethyl (meth)acrylate. These may be used alone or in combination thereof.

The carboxylic acid group-containing (meth)acrylic monomer may be present in an amount of about 0.001 wt % to about 10 wt %, or, for example, about 0.001 wt % to about 5 wt % in the (meth)acrylic copolymer. Within this range, the adhesive film may provide re-peelability while suppressing detachment or bubbling under severe conditions. In one embodiment, the carboxylic acid group-containing (meth) acrylic monomer may be present in an amount of about 0.005 wt % to about 1 wt %, or, for example, about 0.007 wt % to about 0.05 wt % in the (meth)acrylic copolymer.

The hydroxyl group-containing vinyl monomer may be a (meth)acrylate monomer and may be a $C_2$ to $C_{20}$ alkyl group, $C_5$ to $C_{20}$ cycloalkyl group, or $C_6$ to $C_{20}$ aryl group-containing (meth)acrylic acid ester having a hydroxyl group at a terminal thereof or at any other position thereof. For example, the hydroxyl group-containing vinyl monomer may include 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono (meth)acrylate, 1,6-hexanediol mono(meth)acrylate, pentaerythritol tri(meth)acrylate, dipentaerythritol penta(meth) acrylate, neopentyl glycol mono(meth)acrylate, trimethylolpropane di(meth)acrylate, trimethylolethane di(meth)acrylate, 2-hydroxy-3-phenyloxypropyl (meth) acrylate, 4-hydroxycyclopentyl (meth)acrylate, 4-hydroxycyclohexyl (meth)acrylate, or cyclohexanedimethanol mono (meth)acrylate. These may be used alone or in combination thereof.

The hydroxyl group-containing (meth)acrylic monomer may be present in an amount of about 0.1 wt % to about 10 wt %, or, for example, about 0.1 wt % to about 1 wt %, or, for example, about 0.5 wt % to about 1 wt % in the (meth)acrylic copolymer. Within this range, the adhesive film may provide re-peelability while suppressing detachment or bubbling under severe conditions.

The hetero ring-containing vinyl monomer may be a $C_2$ to $C_{10}$ aliphatic or alicyclic saturated or unsaturated hetero ring-containing, or $C_4$ to $C_{20}$ aromatic hetero ring-containing monomer including a hetero atom (for example, at least one of nitrogen, oxygen, and sulfur). For example, the hetero ring-containing vinyl monomer may include acryloyl morpholine. The hetero ring-containing vinyl monomer may be optionally present in an amount of about 10 wt % or less, for example, about 5 wt % or less in the (meth)acrylic copolymer. Within this range, the adhesive film may exhibit improved durability, reliability, and good reworkability.

The amide group-containing vinyl monomer may include acrylamide or methacrylamide. These may be used alone or in combination thereof. The amide group-containing (meth) acrylic monomer may be present in an amount of about 0.1 wt % to about 10 wt %, or, for example, about 0.1 wt % to about 1 wt %, or, for example, about 0.5 wt % to about 1 wt % in the (meth)acrylic copolymer. Within this range, the adhesive film may suppress bubbling under severe conditions.

The aromatic group-containing vinyl monomer may include $C_6$ to $C_{20}$ aryl group or $C_7$ to $C_{21}$ arylalkyl group-containing (meth)acrylic acid esters. In one embodiment, the aromatic group-containing vinyl monomer may include phenyl (meth)acrylate, benzyl (meth)acrylate, or the like. The aromatic group-containing (meth)acrylic monomer may be optionally present in an amount of about 14 wt % or less, or, for example, about 0.1 wt % to about 14 wt %, or, for example, about 1 wt % to about 14 wt %. Within this range, an adhesive layer having a suitable photoelastic coefficient for suppressing light leakage may be obtained.

In one embodiment, the (meth)acrylic copolymer may be a copolymer of a monomer mixture including: about 50 wt % to about 96 wt % of the monomer represented by Formula 2, about 0.1 wt % to about 30 wt % of the alkyl group-containing vinyl monomer, about 0.001 wt % to about 10 wt % of the carboxylic acid group-containing vinyl monomer, about 0.1 wt % to about 10 wt % of the hydroxyl group-containing vinyl monomer, and about 0.1 wt % to about 10 wt % of the amide group-containing vinyl monomer.

In another embodiment, the (meth)acrylic copolymer may be a copolymer of a mixture including: about 50 wt % to about 96 wt % of the monomer represented by Formula 2, about 0.1 wt % to about 20 wt % of the alkyl group-containing vinyl monomer, about 0.001 wt % to about 10 wt % of the carboxylic acid group-containing vinyl monomer, about 0.1 wt % to about 10 wt % of the hydroxyl group-containing vinyl monomer, and about 0.1 wt % to about 14 wt % of the aromatic group-containing vinyl monomer.

The (meth)acrylic copolymer may have a weight average molecular weight of from about 200,000 g/mol to about 2,000,000 g/mol, for example, from about 800,000 g/mol to about 1,000,000 g/mol. Within this range, the adhesive composition may provide a suitable external appearance upon coating, and may suppress appearance defects such as detachment and bubbling after attachment to a polarizing film through drying and aging.

The (meth)acrylic copolymer may have a polydispersity index (PDI) value from about 2 to about 15, for example, from about 3 to about 12. Within this range, the adhesive composition may provide a suitable external appearance upon coating and may suppress appearance defects such as detachment and bubbling after attachment to a polarizing film through drying and aging.

The (meth)acrylic copolymer may have a glass transition temperature from about −75° C. to about 30° C., for example, from about −55° C. to about 0° C. or, for example, from about −50° C. to about −10° C. Within this range, the adhesive film may provide stress relaxation for a polarizing plate and may exhibit improved adhesion to glass, thereby minimizing light leakage while providing high shrinkage resistance.

The (meth)acrylic copolymer may have a viscosity from about 3,000 cPs to about 5,000 cPs at about 25° C. Within this range, the adhesive composition may exhibit improved coatability.

The (meth)acrylic copolymer may be prepared by solution polymerization, photopolymerization, bulk polymerization, or emulsion polymerization, as examples. For example, the (meth)acrylic copolymer may be prepared by solution polymerization at a polymerization temperature of about 50° C. to about 140° C.

A polymerization initiator may be used in polymerization of the copolymer. The polymerization initiator may include an azo-based compound initiator such as azobisisobutyronitrile or azobis cyclohexanecarbonitrile, and/or may include an initiator such as a peroxide, e.g., benzoyl peroxide or acetyl peroxide, or the like.

The polymerization initiator may be present in an amount of about 0.01 parts by weight to about 10 parts by weight based on 100 parts by weight of the alkyl group-containing vinyl monomer. Within this range, the copolymer may be sufficiently polymerized.

Upon polymerization, a solvent may include at least one of ethyl acetate and methylethylketone, as examples.

The (meth)acrylic copolymer may be present in an amount of about 70 wt % to about 99.5 wt %, for example, about 90 wt % to about 99.5 wt %, in terms of solid content, in the adhesive composition. Within this range, the adhesive composition may have an advantage in forming a coating film and may allow uniform distribution of the adhesive components.

The adhesive composition may further include at least one of a crosslinking agent and a silane coupling agent.

Crosslinking Agent

The crosslinking agent may be included in the adhesive composition, and thus may improve the degree of crosslinking of the adhesive film, thereby stabilizing a structure of the adhesive film. In one embodiment, the crosslinking agent may include at least one of an isocyanate, an epoxy, an aziridine, a melamine, an amine, an imide, a carbodiimide, and an amide crosslinking agent.

The isocyanate crosslinking agent may include toluene diisocyanate, 2,4-toluene diisocyanate, 2,6-toluene diisocyanate, hydrogenated trilene diisocyanate, isoform diisocyanate, 1,3-xylene diisocyanate, 1,4-xylene diisocyanate, diphenylmethane-4,4-diisocyanate, 1,3-bisisocyanatomethylcyclohexane, tetramethylxylene diisocyanate, 1,5-naphthalene diisocyanate, hexamethylene diisocyanate, 2,2,4-trimethylhexamethylene diisocyanate, 2,4,4-trimethylhexamethylene diisocyanate, trimethylolpropane-modified toluene diisocyanate, trimethylolpropane-modified tolylene diisocyanate, adducts of toluene diisocyanate with trimethylolpropane, adducts of xylene diisocyanate with trimethylolpropane, triphenylmethanetriisocyanate, methylenebistriisocyanate, or the like, as examples. These may be used alone or in combination thereof.

The crosslinking agent may be present in an amount of about 0.1 wt % to about 20 wt %, for example, about 0.1 wt % to about 9 wt %, in terms of solid content, in the adhesive composition. Within this range, the adhesive composition may exhibit excellent durability, reliability and less change in components and properties thereof over time.

Silane Coupling Agent

The silane coupling agent may be a suitable silane coupling agent included in the adhesive film to improve adhesion to liquid crystal display panels. For example, the silane coupling agent may include an epoxy structure-containing silicon compound, such as 3-glycidoxypropyltrimethoxysilane, 3-glycidoxypropylmethyldimethoxysilane, 2-(3,4-epoxycyclohexyl)ethyltrimethoxysilane, or the like; a polymerizable unsaturated group-containing silicon compound, such as vinyltrimethoxysilane, vinyltriethoxysilane, (meth)acryloxypropyltrimethoxysilane, or the like; an amino group-containing silicon compound, such as 3-aminopropyltrimethoxysilane, N-(2-aminoethyl)-3-aminopropyltrimethoxysilane, N-(2-aminoethyl)-3-aminopropylmethyldimethoxysilane, or the like; or 3-chloropropyltrimethoxysilane. For example, the silane coupling agent may be an epoxy structure-containing silane coupling agent.

The silane coupling agent may be present in an amount of about 0.1 wt % to about 10 wt %, for example, about 0.1 wt % to about 5 wt %, in terms of solid content, in the adhesive composition. Within this range, the adhesive composition may exhibit excellent adhesion to liquid crystal panels and the (meth)acrylic copolymer may exhibit excellent storage stability.

The adhesive composition may further include a solvent. The solvent may include methylethylketone, as an example.

The adhesive composition may further include typical additives, such as UV absorbers, antioxidants, or the like, thereby improving the lifespan of the adhesive film while preventing damage due to light or oxygen.

The adhesive composition may be used as a material of a pressure sensitive adhesive (PSA). For example, the adhesive composition may be used as a PSA adhesive for attaching a polarizing plate to a panel, for example, a liquid crystal display panel. In addition, the adhesive composition may also be used as an adhesive for attaching a plurality of optical films in a polarizing plate including a plurality of protective films.

In accordance with another embodiment, a polarizing plate may include the adhesive film as set forth above. In one embodiment, the polarizing plate may include a polarizer, an optical film formed on a lower surface of the polarizer, and an adhesive layer formed on a lower surface of the optical film. The optical film may include a protective film or a retardation film. The polarizing plate may further include an optical film on an upper surface of the polarizer. As used herein, terms such as "upper surface" and "lower surface" are defined with reference to the accompanying drawings. Thus, it will be understood that the term "upper surface" may be used interchangeably with the term "lower surface".

The adhesive layer may include the above adhesive film or a cured product of the adhesive composition. The optical film may have a photoelastic coefficient from about $0.1 \times 10^{-12} m^2/N$ to about $100 \times 10^{-12} m^2/N$ at about 23° C. and at a wavelength of about 590 nm.

The polarizing plate may have excellent improvement in suppression of light leakage when attached to a panel, for example, a liquid crystal display panel, and may exhibit excellent durability under high temperature and high humidity conditions. In one embodiment, the polarizing plate may have a light leakage value (AL) from about 0 to about 0.4, for example, from about 0 to about 0.1, as represented by Equation 1:

$$\Delta L = [(a+b+d+e)/4]/c - 1 \quad \text{[Equation 1]}$$

wherein a, b, d and e are represent a brightness at midpoints of respective sides of a panel upon which a polarizing plate is stacked, and c is a brightness at a central site of the panel upon which the polarizing plate is stacked).

A lower ΔL indicates a lower light leakage degree.

In measurement of light leakage, the polarizing plate may be left under high temperature conditions of about 85° C. for about 250 hours, or under moist heat resistant conditions of about 60° C. and about 90% RH for about 250 hours, and left at about 25° C. for about 1 hour.

Figure 1:
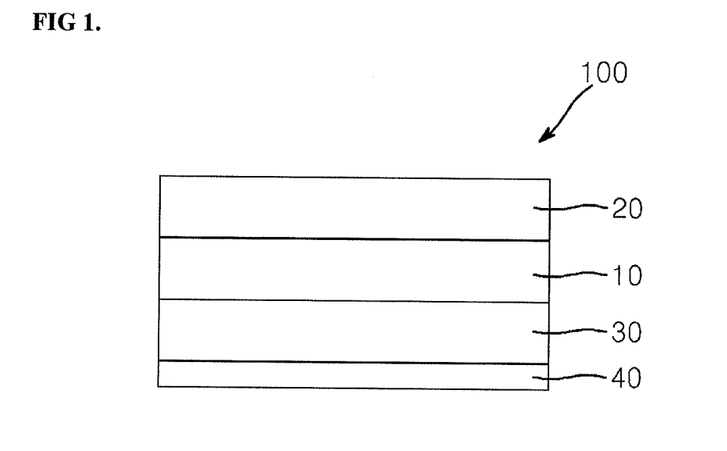
FIG. 1 illustrates a sectional view of a polarizing plate according to one embodiment.

FIG. 1 illustrates a sectional view of a polarizing plate according to an embodiment. Referring to FIG. 1, a polarizing plate may include a polarizer 10, a first optical film 20 formed on an upper surface of the polarizer 10, a second optical film 30 formed on a lower surface of the polarizer 10, and an adhesive layer 40 formed on a lower surface of the second optical film 30. The adhesive layer 40 may be stacked on one surface of a liquid crystal display panel (not shown).

The polarizer may be a film prepared by stretching a polyvinyl alcohol resin film containing a polarizing component such as iodine and the like. The polyvinyl alcohol resin may include a saponified product of polyvinyl alcohol, polyvinyl formal, polyvinyl acetal or ethylene-vinyl acetate copolymers, or the like.

The polarizer may have a thickness from, for example, about 10 μm to about 30 μm.

The first and second optical films may include at least one of a protective film and a retardation film. The protective films may be bonded to both surfaces of the polarizer to protect the polarizer. The protective films may be selected from cellulose films, such as triacetyl cellulose, polycarbonate films, polyester films including polyethylene terephthalate, or the like. Each of the protective films may be stacked in a single layer or in multiple layers. The protective film may have a thickness from about 20 μm to about 80 μm.

For the retardation film, any suitable film useful in polarizing plates and having a phase retardation function may be used. For example, the retardation film may be a film prepared from a olefin film such as a cycloolefin polymer (COP) film, an acrylic film, a cellulose film, or a polycarbonate film. The retardation film may have a thickness from about 10 μm to about 100 μm, for example, from about 10 μm to about 60 μm. Within this range, the retardation film may provide optical compensation and exhibit circular polarization when used in the polarizing plate.

The first and second optical films may be stacked on the polarizer via bonding layers. The bonding layers may be formed of a water-based bonding agent, a pressure sensitive bonding agent, or the like.

The polarizing plate may further include another optical film stacked on one surface of the second optical film.

According to another embodiment, an optical display may include the polarizing plate as described above.

In one embodiment, the optical display may be, for example, a liquid crystal display or an OLED display.

Figure 2:
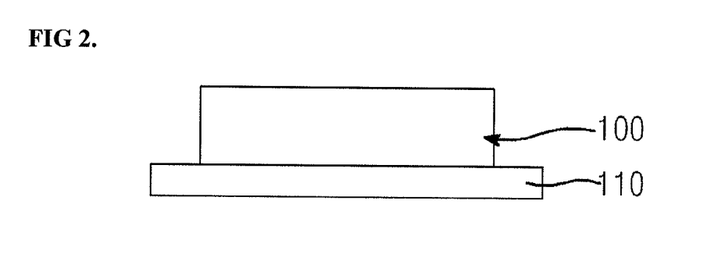
FIG. 2 illustrates a sectional view of an optical display according to one embodiment.

FIG. 2 illustrates a sectional view of an optical display according to an embodiment. Referring to FIG. 2, an optical display may include a panel 110 (for example, a liquid crystal display panel) and a polarizing plate 100 formed on an upper side of the panel 110. The polarizing plate may also be formed on a lower side of the panel.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

PREPARATIVE EXAMPLE 1

Preparation of (Meth)Acrylic Copolymer

In a 1 L 4-neck flask, 50 g of ethyl acetate (EAc), 10 g of methylethylketone (MEK), 95 g of 2-(2-ethoxyethoxy)ethyl acrylate (EOEOEA), 0.01 g of acrylic acid (AA), 0.7 g of 2-hydroxyethyl methacrylate (2-HEMA), 0.6 g of acrylamide (AM), and 3.7 g of butyl acrylate (n-BA) were placed, followed by heating the flask to 70° C. and then maintaining the flask at 70° C. 0.06 g of azobisisobutyronitrile as a polarization initiator was dissolved in 20 g of ethyl acetate and introduced into the flask. Reaction was performed at 65° C. for 3 hours, followed by introducing 170 g of methylethylketone into the flask and then cooling the flask to 40° C., thereby preparing an acrylic copolymer having a viscosity of 4,400 cPs at 25° C.

PREPARATIVE EXAMPLES 2 TO 6

Preparation of (Meth)Acrylic Copolymers (Meth)acrylic copolymers were prepared in the same manner as in Preparative Example 1 except that the amounts of EOEOEA, AA, 2-HEMA, AM, n-BA and benzyl acrylate (BzA) were modified as in Table 1, respectively.

TABLE 1

|  | | Preparative Example 1 | Preparative Example 2 | Preparative Example 3 | Preparative Example 4 | Preparative Example 5 | Preparative Example 6 |
|---|---|---|---|---|---|---|---|
| Copolymer | n-BA (g) | 3.7 | 5.7 | 11.7 | 7.7 | 98.7 | 3.7 |
|  | EOEOEA (g) | 95 | 90 | 80 | 80 | 0 | 0 |
|  | BzA (g) | 0 | 3 | 7 | 11 | 0 | 95 |
|  | AA (g) | 0.01 | 0.01 | 0.01 | 0.01 | 0.01 | 0.01 |
|  | 2-HEMA (g) | 0.7 | 0.7 | 0.7 | 0.7 | 0.7 | 0.7 |
|  | AM (g) | 0.6 | 0.6 | 0.6 | 0.6 | 0.6 | 0.6 |
| Viscosity (25° C., cPs) | | 4,400 | 4,400 | 3,600 | 3,900 | 2,400 | 2,200 |
| Solid content (wt %) | | 24.8 | 24.9 | 24.7 | 24.8 | 23.6 | 22.1 |
| Weight average molecular weight (g/mol) | | 800,000~900,000 | 800,000~900,000 | 800,000~900,000 | 800,000~900,000 | 1,700,000 | 200,000~300,000 |
| Glass transition temperature (° C.) | | −49 | −49 | −48 | −47 | −54 | 5 |

Details of components used in Examples and Comparative Examples are as follows.

(Meth)acrylic copolymer: (Meth)acrylic copolymers prepared in Preparative Examples Crosslinking agent: Trimethylolpropane-modified tolylene diisocyanate (Colonate-L, Nippon Polyurethane Industry Co., Ltd.) which is an isocyanate crosslinking agent Silane coupling agent: 3-glycidoxypropyltrimethoxysilane (KBM-403, Shin-Etsu Chemical Co., Ltd.)

EXAMPLES 1 TO 4 AND COMPARATIVE EXAMPLES 1 TO 2

A (meth)acrylic copolymer, a crosslinking agent and a silane coupling agent were introduced into 18 parts by weight of methylethylketone used as a solvent in amounts as listed in Table 2 (unit: parts by weight), followed by stirring at 25° C. for 30 minutes, thereby preparing adhesive compositions for polarizing plates.

The prepared adhesive compositions for polarizing plates or adhesive films for polarizing plates prepared from the adhesive compositions were evaluated as to the following properties. Results are shown in Table 3.

Photoelastic coefficient: With both ends of an adhesive film sample (size: 2 cm×2 cm×1,000 μm, width×length× thickness) clamped, retardation at the center of the sample at 23° C. and at a wavelength of 590 nm was measured using a spectroscopic ellipsometer (M-220, JASCO Co., Ltd.) while applying stress (5 N~15 N) to the sample, thereby calculating a photoelastic coefficient of the sample from a slope of a function of stress and retardation.

Durability and Reliability: Polarizing plate (100 mm×175 mm, width×length) each including an adhesive layer (thickness: 20 μm) prepared from the adhesive composition were attached to both surfaces of a glass substrate, and a pressure of 4 kg/cm² to 5 kg/cm² was applied to the polarizing plates to prepare a specimen. Here, the specimen was prepared in a cleanroom so as not to suffer from bubbling or contamination. For the prepared specimen, moist heat resistance was evaluated by leaving the specimen under conditions of 60° C. and 90% RH for 500 hours, followed by observing whether the specimen suffered from bubbling or peeling. The specimen was left at 25° C. for 1 hour before evaluation and then observed with the naked eye or with a microscope. Heat resistance was evaluated by leaving the specimen at 85° C. for 500 hours, followed by observing whether the specimen suffered from bubbling or peeling. Evaluation criteria were as follows.

◯: Neither bubbling nor peeling

Δ: Slight bubbling or peeling

X: Bubbling or peeling

Light leakage: Light leakage was evaluated using the same polarizing plate as in durability and reliability evaluation. Whether light was leaked in a darkroom was evaluated using a backlight unit. The adhesive film-coated polarizing plates (400 mm×200 mm, width×length) were attached to both surfaces of a glass substrate (410 mm×210 mm×0.7 mm, width×length×thickness) such that optical axes of the polarizing plates were perpendicular to each other. The prepared specimen was left at 60° C. for 500 hours (heat resistant conditions) or at 50° C. and 90% RH for 500 hours (moist heat resistant conditions), and then left at 25° C. for 1 hour or more before use thereof. After operating a liquid crystal display using the sample, brightness at the front side of the display panel was measured at a height of 1 m using a brightness tester (RISA, Hiland Co., Ltd.).

Figure 3:
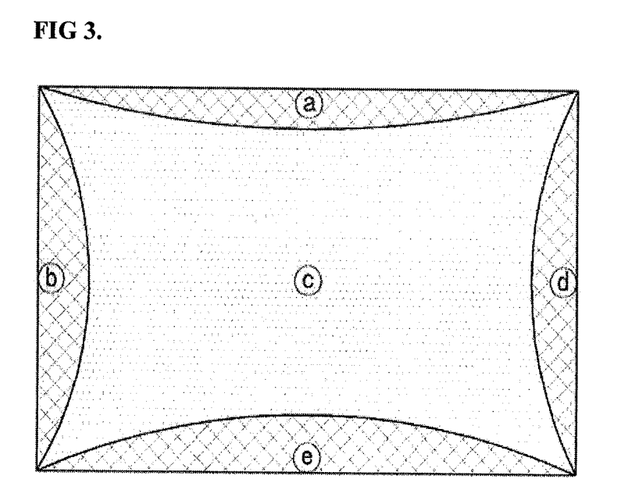
FIG. 3 illustrates measurement locations for light leakage on a panel.

The brightness (c) at the central region of the panel and the brightness (a), (b), (d) and (e) at edges of the panel at which light leakage occurred were measured. As shown in FIG. 3, brightness measuring points were placed at four midpoints of each side of the panel and at the center of the panel, respectively. Here, each side of the panel adjoined the circumference of a circle for brightness measurement having a radius of 0.5 cm. In FIG. 3, ⓐ, ⓑ, ⓒ, ⓓ and ⓔ indicate brightness measuring points. The degree of light leakage (ΔL) was quantified according to the following Equation 1. A lower ΔL value indicates better light leakage characteristics, which are evaluated according to the following criteria.

$$\Delta L = [(a+b+d+e)/4]/c - 1 \qquad \text{<Equation 1>}$$

wherein a, b, d and e represent the brightness measured at a, b, d and e corresponding to brightness measurement points of FIG. 3, respectively, and c is brightness at the center c.

◯: No difference in brightness upon observation with the naked eye (unable to recognize light leakage)

Δ: Slight difference in brightness upon observation with the naked eye

X: Significant difference in brightness upon observation with the naked eye

TABLE 2

| | | Example 1 | Example 2 | Example 3 | Example 4 | Comparative Example 1 | Comparative Example 2 |
|---|---|---|---|---|---|---|---|
| | | | | | | | (unit: parts by weight) |
| Copolymer | Preparative Example 1 | 100 | — | — | — | — | — |
| | Preparative Example 2 | — | 100 | — | — | — | — |
| | Preparative Example 3 | — | — | 100 | — | — | — |
| | Preparative Example 4 | — | — | — | 100 | — | — |
| | Preparative Example 5 | — | — | — | — | 100 | — |
| | Preparative Example 6 | — | — | — | — | — | 100 |
| Crosslinking agent | | 0.5 | 0.5 | 0.5 | 0.5 | 0.5 | 0.5 |
| Silane coupling agent | | 0.2 | 0.2 | 0.2 | 0.2 | 0.2 | 0.2 |

TABLE 3

| | | Example 1 | Example 2 | Example 3 | Example 4 | Comparative Example 1 | Comparative Example 2 |
|---|---|---|---|---|---|---|---|
| Photoelastic coefficient (m$^2$/N) | | $-110 \times 10^{-12}$ | $-85 \times 10^{-12}$ | $50 \times 10^{-12}$ | $120 \times 10^{-12}$ | $-650 \times 10^{-12}$ | Unable to measure |
| Durability and Reliability | Heat resistance | ○ | ○ | ○ | ○ | Δ | X |
| | Moist heat resistance | ○ | ○ | ○ | ○ | ○ | X |
| | Light leakage | ○ | ○ | ○ | ○ | X | X |
| | | 0.1 | 0.1 | 0.2 | 0.3 | 3.5 | 3.8 |

As shown in Table 3, the adhesive film according to embodiments (Examples 1 to 4) exhibited good durability and reliability, and had excellent improvement in terms of light leakage. Conversely, the adhesive film of Comparative Example 1, which did not include the monomer represented by Formula 2, exhibited lower durability and reliability than the adhesive film according embodiments and had no improvement in terms of light leakage. In addition, the adhesive film of Comparative Example 2, which included the aromatic group-containing monomer without including the monomer represented by Formula 2, had a low molecular weight due to difficult polymerization thereof, and exhibited almost no adhesion due to high Tg, and thus, exhibited no durability and reliability.

By way of summation and review, in a polarizing plate having a structure in which the protective film is stacked on the polarizer with an adhesive layer interposed therebetween, stress may be generated at an interface between the protective film and the polarizer or at an interface between the protective film and another member bonded to the protective film due to environmental variation. Phase retardation of the protective film may be changed due to photoelastic birefringence caused by the stress. In particular, dimensional change of each member may be larger at an end of a screen than at a central portion thereof. Accordingly, the screen may suffer from significant light leakage at the end thereof.

With the recent trend of producing larger-size and higher-brightness image displays, an internal temperature of the image displays may be prone to rise due to heat emission from a light source. Moreover, when thin image displays, such as liquid crystal displays and organic EL displays, are used in severe environments such as high temperature and high humidity environments, light leakage at the end of the screen upon environmental change may become visible.

Embodiments provide an adhesive film for a polarizing plate. The adhesive film according to embodiments provides excellent improvement with respect to light leakage and exhibits excellent durability and reliability even under severe use conditions of high temperature or high humidity.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A polarizing plate, comprising:
a polarizer;
an optical film on a lower surface of the polarizer; and
an adhesive film on a lower surface of the optical film,
wherein the adhesive film is formed of a composition including a (meth)acrylic copolymer formed using at least a monomer represented by Formula 2:

[Formula 2]

wherein:

A is a $C_1$ to $C_{10}$ aliphatic hydrocarbon group;

B is —O—;

$R_2$ is a $C_1$ to $C_{10}$ aliphatic hydrocarbon group;

$R_1$ is hydrogen or a $C_1$ to $C_5$ alkyl group; and n is an integer from 1 to 5, the monomer represented by Formula 2 is present in an amount of about 50 wt % to about 96 wt % in the (meth)acrylic copolymer, and the adhesive film has a photoelastic coefficient from about $-120 \times 10^{-12} m^2/N$ to about $120 \times 10^{-12} m^2/N$, as measured at about 23° C. and at a wavelength of about 590 nm.

2. The polarizing plate as claimed in claim 1, wherein the (meth)acrylic copolymer includes a copolymer formed of a mixture of the monomer represented by Formula 2, an alkyl group-containing vinyl monomer, a carboxylic acid group-containing vinyl monomer, a hydroxyl group-containing vinyl monomer, and an amide group-containing vinyl monomer.

3. The polarizing plate as claimed in claim 2, wherein the mixture includes:

about 50 wt % to about 96 wt % of the monomer represented by Formula 2;

about 0.1 wt % to about 30 wt % of the alkyl group-containing vinyl monomer;

about 0.001 wt % to about 10 wt % of the carboxylic acid group-containing vinyl monomer;

about 0.1 wt % to about 10 wt % of the hydroxyl group-containing vinyl monomer; and about 0.1 wt % to about 10 wt % of the amide group-containing vinyl monomer.

4. The polarizing plate as claimed in claim 3, wherein the mixture further includes an aromatic group-containing vinyl monomer.

5. The polarizing plate as claimed in claim 4, wherein the mixture includes:

about 50 wt % to about 96 wt % of the monomer represented by Formula 2;

about 0.1 wt % to about 20 wt % of the alkyl group-containing vinyl monomer;

about 0.001 wt % to about 10 wt % of the carboxylic acid group-containing vinyl monomer;

about 0.1 wt % to about 10 wt % of the hydroxyl group-containing vinyl monomer;

about 0.1 wt % to about 10 wt % of the amide group-containing vinyl monomer; and about 0.1 wt % to about 14 wt % of the aromatic group-containing vinyl monomer.

6. The polarizing plate as claimed in claim 1, wherein the composition further includes at least one of a crosslinking agent and a silane coupling agent.

7. The polarizing plate as claimed in claim 6, wherein the crosslinking agent includes an isocyanate crosslinking agent.

8. The polarizing plate as claimed in claim 6, wherein the silane coupling agent includes an epoxy structure.

9. The polarizing plate as claimed in claim 6, wherein the composition includes about 70 wt % to about 99.5 wt % of the copolymer, about 0.1 wt % to about 20 wt % of the crosslinking agent, and about 0.1 wt % to about 10 wt % of the silane coupling agent in terms of solid content.

10. The polarizing plate as claimed in claim 1, wherein the adhesive film has a thickness of greater than 0 μm and less than or equal to about 100 μm.

11. The polarizing plate as claimed in claim 1, further comprising an optical film on an upper surface of the polarizer.

12. The polarizing plate as claimed in claim 11, wherein the optical film is a triacetyl cellulose film, and the adhesive film directly contacts the triacetyl cellulose film.

13. The polarizing plate as claimed in claim 1, wherein the polarizing plate has a light leakage value (ΔL) from about 0 to about 0.4, as represented by Equation 1:

$$\Delta L = [(a+b+d+e)/4]/c - 1 \quad \text{[Equation 1]}$$

wherein a, b, d and e represent a brightness at midpoints of respective sides of a panel upon which the polarizing plate is stacked, and c is brightness at a central site of the panel upon which the polarizing plate is stacked.

14. An optical display including the polarizing plate as claimed in claim 1.

* * * * *